といった

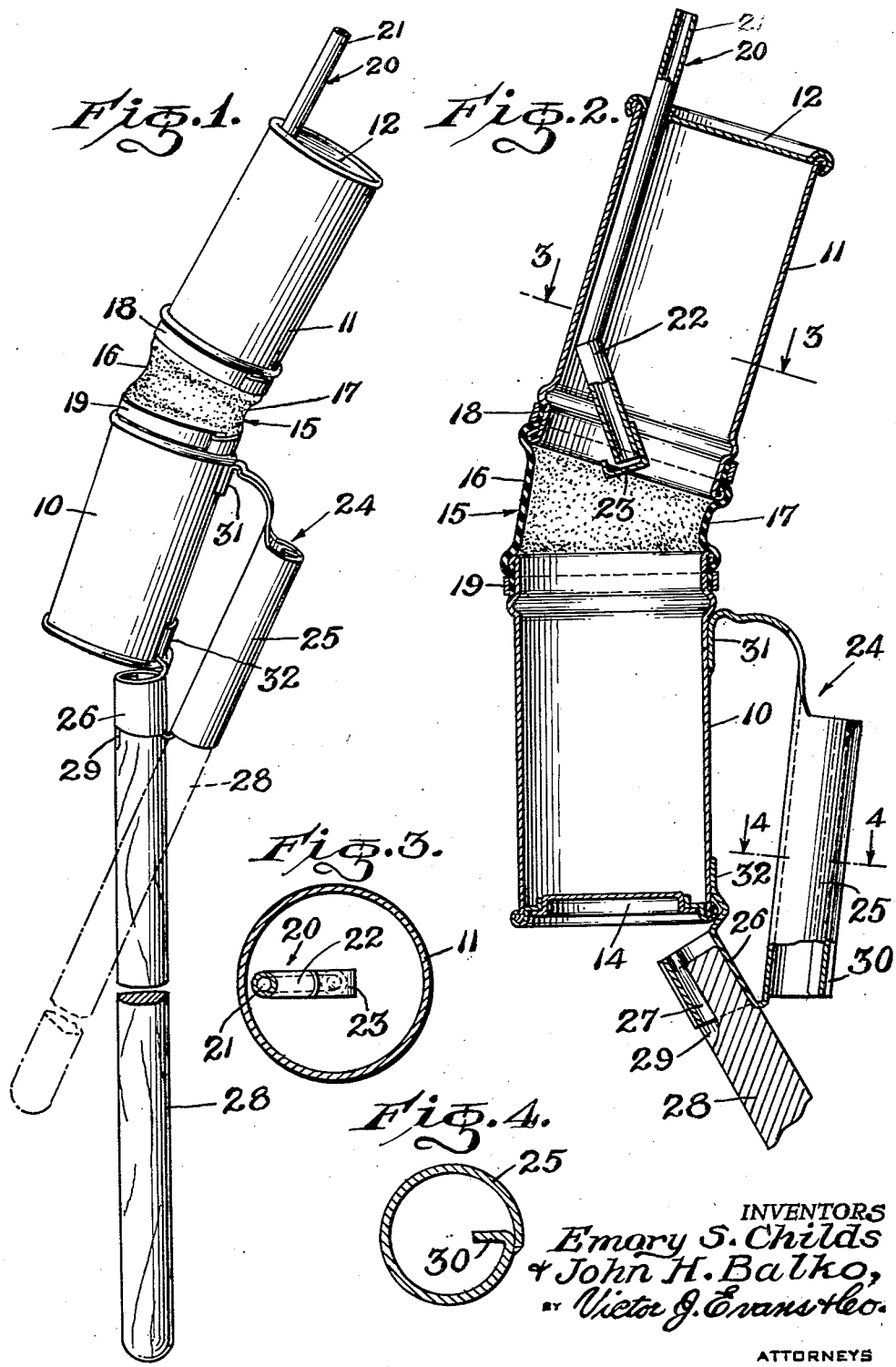

United States Patent Office 2,799,964
Patented July 23, 1957

2,799,964

INSECT POWDER DUSTER

Emory S. Childs and John H. Balko, Kingsville, Tex.

Application August 28, 1953, Serial No. 377,108

4 Claims. (Cl. 43—146)

This invention relates to a dust dispenser, and more particularly to a device for dispensing insect killing dust.

This invention is an improvement over the Insect Dust Dispenser shown and described in my co-pending application, Serial No. 333,916, now matured as U. S. Patent No. 2,738,615 issued March 20, 1956.

The object of the invention is to provide an insect dust killing dispenser which includes a handle means for permitting the duster to be used in ordinarily inaccessible locations, such as under a house, in grass, or in trees, brushes or the like.

Another object of the invention is to provide a dust dispenser which includes a pair of handles that are adapted to be selectively engaged by a stick or tubular member so that the duster can be used in hard to reach places, there being cooperating means on the handles and stick for maintaining the parts connected together.

A further object of the invention is to provide an insect dust dispenser which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a perspective view of the duster, constructed according to the present invention.

Figure 2 is a longitudinal sectional view taken through the duster, and with parts broken away and in section.

Figure 3 is a sectional view taken on the line 3—3 of Figure 2.

Figure 4 is a sectional view taken on the line 4—4 of Figure 2.

Referring in detail to the drawings, the numerals 10 and 11 designates a pair of casings which are hollow and tubular, and the casings or containers 10 and 11 are arranged in angular relation with respect to each other. Suitable insect killing powder is adapted to be positioned in the casings and for filling the casings with insect powder, a cap or lid 14 may be removed from the casing 10. The other casing 11 is provided with a closed end 12.

Interconnecting the casings 10 and 11 together is a sleeve or bellows 15 which is made of any suitable material such as rubber. The sleeve 15 includes a long side 16 and a short side 17, and portions of the sleeve 15 overlie the adjacent end portions of the casings 10 and 11. The sleeve 15 is maintained on the casings 10 and 11 by means of clamps 18 and 19, Figures 1 and 2. Extending outwardly from the casing 11 is a nozzle or discharge member 20, and the nozzle 20 includes a first section 21 which is secured to the end 12 in any suitable manner, as for example by welding. A second section 22 is arranged angularly with respect to the first section 21, and a bracket or flange 23 is secured to the section 22. The flange 23 serves to control passage of the insect dust through the nozzle 20 and prevents an excess of the powder from being dispensed at any one time.

A handle means is provided and this handle means comprises a pair of tubular sockets 25 and 26, the handle means being designated in its entirety by the numeral 24. The sockets 25 and 26 are hollow and are open ended, and a longitudinally extending rib 27 extends inwardly from the socket 26. The rib 27 is adapted to fit in a slot 29 in a pole or stick 28 so as to help maintain the pole 28 in the socket 26. The pole 28 frictionally engages the sockets, so that the pole 28 can be removed from the socket 26 and arranged in engagement with the socket 25 when desired. The pole is only arranged in engagement with one of the sockets at a time. A longitudinally extending rib 30 extends inwardly from the socket 25 for engaging a suitable slot in the pole to help prevent accidental disengagement or accidental rotation of the parts.

For securing the handle means 24 to the casing 10, a finger 31 extends from the socket 25 and is secured to the exterior surface of the casing 10 in any suitable manner, as for example by welding. A similar finger 32 extends from the other socket 26 and is also secured to the casing 10 in any suitable manner.

From the foregoing it is apparent that a duster or dispenser has been provided which is an improvement over the duster shown and described in my co-pending application, Serial No. 333,916, now matured as U. S. Patent No. 2,738,615 issued March 20, 1956. In use the insect killing powder may be positioned in the casings by removing the cap 14 and then the cap 14 can be replaced on the casing 10. Then, the casings can be reciprocated or shaken whereby the bellows 15 causes the area within the two casings to be increased and decreased continuously and as the area is reduced or decreased the powder will be discharged through the spout or nozzle 20. The powder may also be caused to be discharged by shoving the end of the casing 11 against a suitable object so that the area is decreased. To actuate the device, the hand may grip a suitable pole 28 which can be arranged in either of the sockets 25 or 26. Thus, the dusting device can be stuck beneath houses or into brushes or trees which would otherwise be inaccessible.

The two tubular members 25 and 26 are of different lengths and are arranged in angular relation with respect to each other.

We claim:

1. An insect powder killing duster, comprising a first and second hollow tubular casing arranged in spaced angular relation with respect to each other, a resilient sleeve interconnecting said casings together and including a short side and a long side, portions of said sleeve overlying the adjacent portions of said casings, clamps for maintaining said sleeve on said casings, a discharge nozzle extending from an end of said first casing and including a first section and a second section arranged angularly with respect to said first section, said nozzle having a flange adjacent the inner end of said nozzle, a cap detachably connected to said second casing, and handle means connected to said second casing.

2. The apparatus as described in claim 1, wherein said last named means comprises a pair of open ended hollow tubular sockets arranged angularly with respect to each other and secured to said second casing, each socket constituting a reinforcement for its companion socket and the second casing, and longitudinally extending ribs extending inwardly from said sockets.

3. In an insect powder killing duster, a first and second hollow tubular casing arranged in spaced angular relation with respect to each other, said casings having the same diameter, the inner ends of said casings being open, a resilient sleeve interconnecting said casings together and including a short side and a long side, portions of said sleeve overlying the adjacent portions of said casings, detachable clamps surrounding portions of said sleeve and casing for maintaining said sleeve on said casings, a discharge nozzle extending from an end of said first casing and including a first tubular section and a second tubular section arranged angularly with respect to said first section, said nozzle having a flange adjacent the inner end of said nozzle, and a cap detachably connected to an end of said second casing, the outer end of said first casing being closed and having an aperture therein for the projection therethrough of the outer end of said nozzle, the air and powder both moving through the same nozzle so that when air is sucked in, the nozzle is cleaned of powder.

4. A handle mechanism for an insect duster casing comprising a pair of open ended hollow tubular sockets arranged angularly with respect to each other and adapted to be secured to said casing, longitudinally extending ribs extending inwardly from said sockets, one of said sockets being longer than the other of said sockets, means integral with said sockets for interconnecting said sockets together, a finger extending from each of said sockets, and a pole for selectively engaging said sockets and having slots for receiving said ribs, said sockets constituting reinforcing means for each other and adapted to reinforce said casing.

References Cited in the file of this patent

UNITED STATES PATENTS

| | | |
|---|---|---|
| 1,407,131 | De Gregory | Feb. 21, 1922 |
| 1,661,092 | Robbins | Feb. 28, 1928 |
| 1,716,011 | Sprenger et al. | June 4, 1929 |
| 1,958,165 | Le Compte | May 8, 1934 |
| 2,206,208 | Thomas | July 2, 1940 |
| 2,349,875 | Mandlak | May 30, 1944 |

FOREIGN PATENTS

| | | |
|---|---|---|
| 813,909 | Germany | July 19, 1951 |